(12) United States Patent
Trainin (10) Patent No.: US 8,189,619 B2
(45) Date of Patent: *May 29, 2012

(54) SYSTEMS AND METHODS FACILITATING HIGH THROUGHPUT CONTROL IN WIRELESS COMMUNICATIONS

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,301

(22) Filed: Aug. 16, 2011

(65) Prior Publication Data

US 2011/0299517 A1  Dec. 8, 2011

Related U.S. Application Data

(63) Continuation of application No. 11/432,129, filed on May 11, 2006, now Pat. No. 8,098,689.

(51) Int. Cl.
H04J 3/24 (2006.01)
(52) U.S. Cl. ........ 370/474; 370/329; 370/338; 455/450; 455/522
(58) Field of Classification Search .......... 370/278, 370/282, 503, 349, 338, 474; 455/69, 522, 455/572–574, 450–452.2
See application file for complete search history.

(56) References Cited

U.S. PATENT DOCUMENTS

| | | | |
|---|---|---|---|
| 5,212,715 A * | 5/1993 | Pickert et al. | 375/366 |
| 5,442,637 A | 8/1995 | Nguyen | |
| 5,559,804 A * | 9/1996 | Amada et al. | 370/347 |
| 6,512,754 B2 | 1/2003 | Feder et al. | |
| 6,529,519 B1 | 3/2003 | Steiner et al. | |
| 6,577,630 B1 | 6/2003 | Markwalter et al. | |
| 6,697,983 B1 * | 2/2004 | Chintada et al. | 714/748 |
| 6,888,844 B2 | 5/2005 | Mallory et al. | |
| 7,000,031 B2 | 2/2006 | Fischer et al. | |
| 7,035,285 B2 * | 4/2006 | Holloway et al. | 370/474 |
| 7,388,853 B2 * | 6/2008 | Ptasinski et al. | 370/338 |
| 7,502,855 B2 | 3/2009 | Swanson et al. | |
| 7,551,638 B2 * | 6/2009 | Trainin | 370/429 |
| 7,768,993 B2 * | 8/2010 | Giese et al. | 370/349 |
| 2004/0187068 A1 | 9/2004 | Chintada et al. | |
| 2005/0041662 A1 | 2/2005 | Kuo et al. | |
| 2005/0135284 A1 | 6/2005 | Nanda et al. | |
| 2005/0170781 A1 | 8/2005 | Jacobsen et al. | |
| 2005/0181728 A1 | 8/2005 | Hansen et al. | |

(Continued)

FOREIGN PATENT DOCUMENTS

WO  2007/134124 A1  11/2007

OTHER PUBLICATIONS

International Preliminary Report on Patentability received for PCT Patent Application No. PCT/US2007/068592, issued on Nov. 11, 2008, 5 pgs.

(Continued)

Primary Examiner — Sharad Rampuria
(74) Attorney, Agent, or Firm — Schubert Law Group PLLC (57) ABSTRACT

Embodiments include systems and methods for frame tunneling in a wireless communications system comprising digital beam forming. Embodiments comprise a first and second frame control field with the second frame control field comprising a High Throughput Control (HTC) enabling field. If the HTC enabling field is enabled, then an HTC field is sent.

20 Claims, 8 Drawing Sheets

U.S. PATENT DOCUMENTS

| | | |
|---|---|---|
| 2005/0213603 A1 | 9/2005 | Karighattam et al. |
| 2006/0140163 A1 | 6/2006 | He et al. |
| 2006/0171406 A1 | 8/2006 | Kwon et al. |
| 2008/0291855 A1 | 11/2008 | Bata et al. |

OTHER PUBLICATIONS

International Search Report received for PCT Patent Application No. PCT/US2007/068592, mailed on Oct. 17, 2007, 1 pg.

* cited by examiner

SYSTEMS AND METHODS FACILITATING HIGH THROUGHPUT CONTROL IN WIRELESS COMMUNICATIONS

FIELD

Embodiments are in the field of wireless communications. More particularly, embodiments are in the field of communications protocols between wireless transceivers.

BACKGROUND

A wireless communication system comprises at least one transmitter to transmit information over an RF (Radio Frequency) channel and at least one receiver to receive the information from the RF channel. More particularly, a wireless communication system may comprise two or more communication devices spaced apart, each device having a transceiver comprising a transmitter and a receiver. Typically, at least one device transceiver is able to transmit to and receive from the transceivers of multiple other devices. Some wireless communications systems utilize Digital Beam Forming techniques to steer information into separate spatial channels.

BRIEF DESCRIPTION OF THE DRAWINGS

For the following detailed description, reference may be made to the accompanying drawings in which like references may indicate similar elements.

DETAILED DESCRIPTION OF EMBODIMENTS

The following is a detailed description of embodiments depicted in the accompanying drawings. The embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

Embodiments include systems and methods for frame tunneling in a wireless communications system comprising digital beam forming. Embodiments comprise a first and second frame control field with the second frame control field comprising a High Throughput Control (HTC) enabling field. If the HTC enabling field is enabled, then an HTC field is sent that announces a sounding frame and a type of channel estimation feedback expected from a receiving station.

Figure 1:
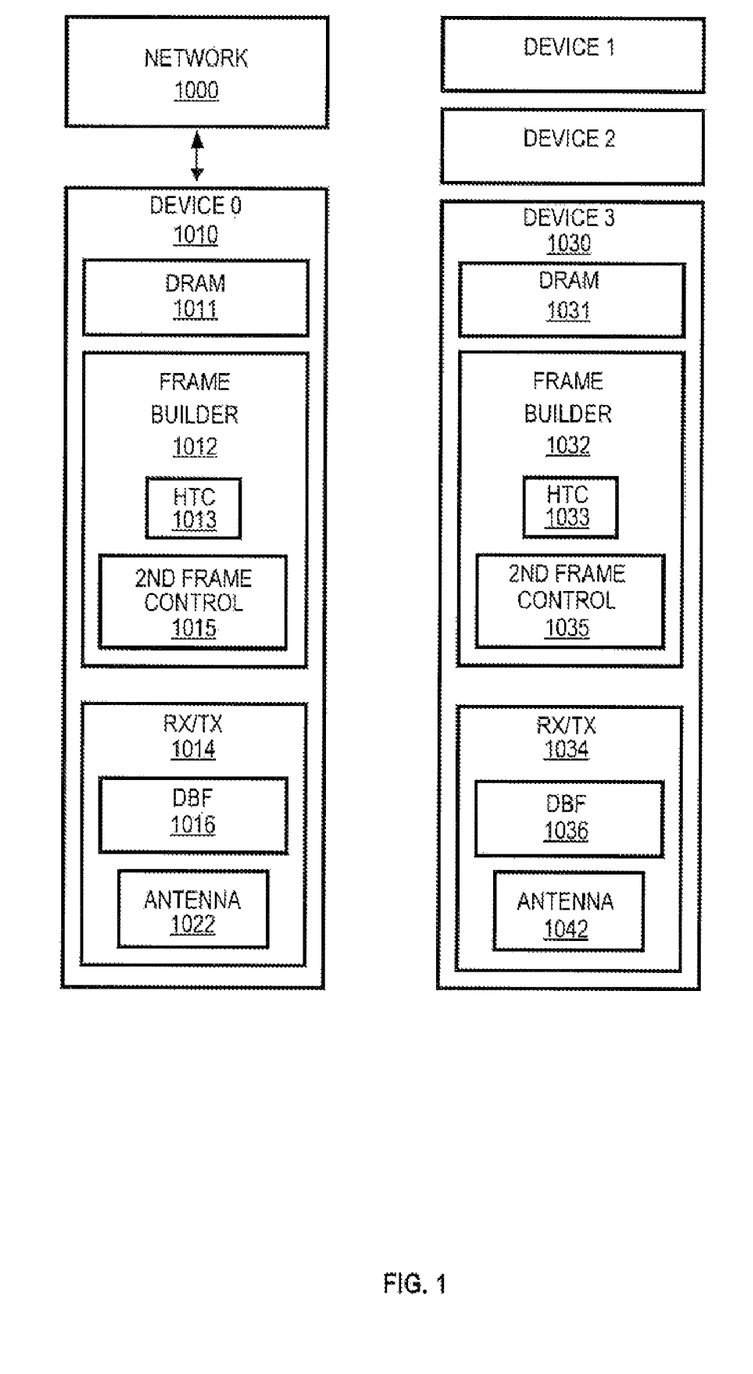
FIG. 1 depicts an embodiment of an example wireless network comprising a plurality of communications devices, including multiple fixed or mobile communications devices.

FIG. 1 shows an embodiment of an example wireless network. This configuration comprises a first communications device 1010 that is wire line or wirelessly connected to a network 1000 such as the Internet or a local intranet. Communication device 1010 may communicate wirelessly with a plurality of communication devices 1030. For ease of reference, the communications devices 1010, 1030 are labeled as devices 0, 1, 2, and 3. A device 1030 may be a computer, laptop, notebook, cellular phone, PDA (Personal Digital Assistant), or other wireless-capable device. Thus, a communications device may be mobile or fixed. Communications device 1010 and devices 1030 each comprise a transceiver (RX/TX) 1014, 1034. Each transceiver comprises an RF transmitter and an RF receiver. Each RF transmitter impresses digital data onto an RF frequency for transmission of the data by electromagnetic radiation. An RF receiver receives electromagnetic energy at an RF frequency and extracts the digital data there from. FIG. 1 may depict a Multiple-Input Multiple-Output (MIMO) system. The wireless communication system of FIG. 1 is intended to represent any of a wide variety of wireless systems which may include without limitation, NFC (Near Field Communications), WLAN (Wireless Local Area Network), WMAN (Wireless Metropolitan Area Network), WiMAX (Worldwide Interoperability for Microwave Access), 2.5-3G cellular, 3G RAN (Radio Access Network), 4G, RFID (Radio Frequency Identification), etc. In particular, in a WLAN, device 1010 may represent the WLAN Access Point that controls a variety of different WLAN devices compatible with different parts of the Institute for Electrical and Electronics Engineers (IEEE) standard 802.11, including 802.11a, 802.11b, and 802.11g, as well 802.11n. Similarly, devices 1030 may comply with different ones of these standards.

In one embodiment, communications device 1010 comprises a Digital Beam Former (DBF) 1016. DBF 1016 transforms information signals into signals to be applied to elements of an antenna array 1022. Antenna array 1022 is an array of individual, separately excitable antenna elements. The signals applied to the elements of antenna array 1022 cause it to radiate a plurality of spatial channels. Each spatial channel so formed may carry information to one or more of communication devices 1030. Similarly, a communication device 1030 comprises a transceiver 1032 to receive and transmit signals from and to device 1010. Transceiver 1034 may also comprise an antenna array 1042 and a DBF 1036. In parallel with Digital Beam Forming, transceiver 1034 is capable of transmitting and receiving signals in accordance with IEEE standards 802.11a and 802.11g.

Communication devices 1010, 1030 also comprise a frame builder 1012, 1032, respectively. Frame builder 1012, 1032 constructs frames that prefix data to be transmitted over the RF channel. These frames may be stored in Direct Random Access Memory (DRAM) 1011, 1031. A purpose of a frame is to establish and maintain synchronized communications between the transmitting device and the receiving device. Each frame builder may supply a High Throughput Control (HTC) field 1013, 1033. The HTC provides a bit sequence that announces the transmission of a sounding frame that enables a receiver of the sounding frame to estimate the channel between the receiver and transmitter of the HTC. The HTC also specifies a type of feedback expected from the receiver. In one mode of operation, the type of feedback is an estimate of a channel matrix, wherein another type of feedback is a steering matrix for beam steering of information into a plurality of substantially independent spatial channels. A main difference between these two types of feedback is that the channel matrix is more precise but takes longer to transmit back to the transmitter, whereas a steering matrix is shorter but takes longer to compute by the receiver.

Figure 1A:
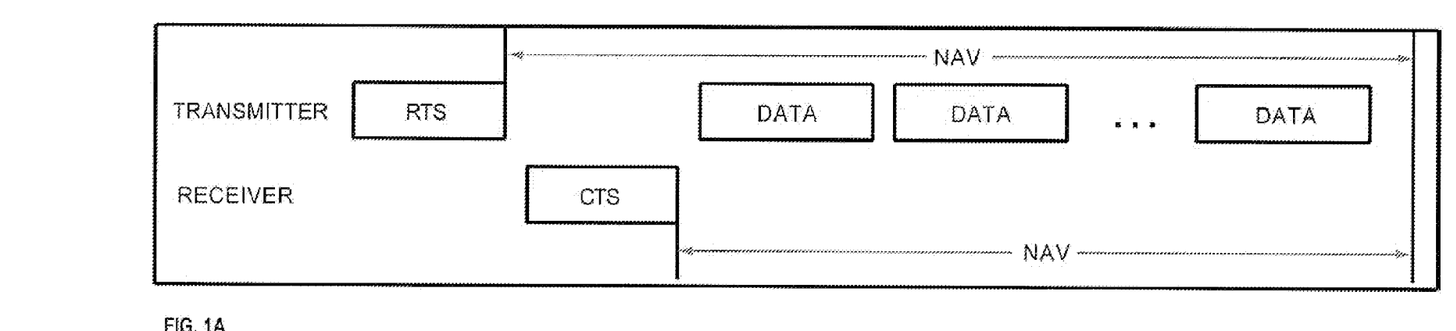
FIG. 1A depicts a transfer protocol for establishing communications between wireless communication devices.

FIG. 1A illustrates the operation of one of the functions of a frame. To establish communications, a transmitter transmits a control frame. The control frame comprises a Request To Send (RTS) field that is received by a receiver. The control frame also comprises an address field and a duration field (not shown in FIG. 1A). The address field indicates to which receiver the transmission is intended. The duration field comprises a Network Allocation Vector (NAV) that indicates the duration of time reserved for the transmission. After the RTS signal is sent, but before the data of the transmission is sent, the transmitter waits to receive a Clear To Send (CTS) signal from the receiver. If the CTS is not received within a short period of time, the intended transmission is temporarily abandoned and a new RTS signal may be sent later. Once the CTS signal is received, the transmitter sends the data during the duration of the NAV, as shown in FIG. 1A. If the data is successfully received, the receiver transmits an acknowledgment (ACK) signal to the transmitter. If an ACK signal is not received, the source station may immediately schedule a retransmission.

The methodology depicted in FIG. 1A is used in wireless systems that include Wireless Local Area Networks (WLAN) and Wireless Metropolitan Area Networks (WMAN) that are compliant with Standards 802.11, promulgated by the Institute of Electrical and Electronics Engineers (IEEE 802.11). The standards encompass legacy systems that comply with the existing IEEE 802.11 standard, and existing supplemental standards such as 802.11a, 802.11b and 802.11g. These standards do not specify digital beam forming. However, a new supplemental standard being developed and designated IEEE 802.11n does provide specifications for digital beam forming. In particular, the standard 802.11n specifies that a High Throughput Control (HTC) field be transmitted as part of a frame that prefixes the data to be transmitted. However, a simple concatenation of the HTC with the control frame renders a legacy station unable to assert the NAV during the duration field because the format no longer complies with legacy standards for frame format. Thus, a new frame structure is needed for High Throughput Control. Accordingly, frame builder 1012, 1032 provides a second frame control field 1015, 1035, as will be explained subsequently.

Figures 1B, 1C:
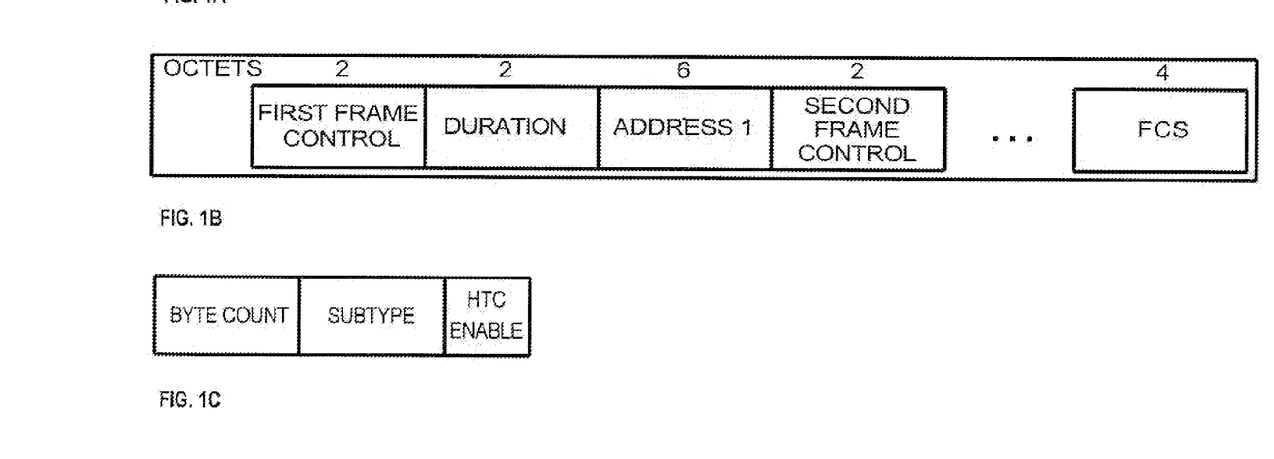
FIG. 1B depicts a tunneling frame including a first and second frame control field.
FIG. 1C depicts a second frame control field.

FIG. 1B shows an embodiment of a tunneling frame format built by frame builder 1012, 1032. A first frame control field is provided that conforms to the current state of the new 802.11n standard under development. The first frame control field may provide a protocol version field to specify the applicable standard. A type field specifies whether the frame is a management, control or data frame. In the present case, for transmission of HTC, the type is control. Also, there is a subtype field to specify the function of the frame. In the present case, the subtype is tunnel. The duration field that follows the first frame control field specifies the duration of this transmission. The address field specifies the address of the intended receiver or receivers for this transmission.

Following the address field is a second frame control field 1015, 1035. FIG. 1C shows a more detailed view of a second frame control field. The second frame control field comprises a byte count field that enables early detection of error in transmission. The following field is a subtype field which specifies the functionality of the frame. A subtype may be, for example, an ACK (acknowledgement), RTS, CTS, BA (block acknowledgement), or other subtype. Following the subtype field is an HTC enable field. When this field is enabled (logic level 1, for example), the HTC field will immediately follow. Subsequent to the second frame control field is a Frame Check Sequence (FCS) that comprises a 32 bit cyclic redundancy sequence used to determine if the frame is received correctly.

Figure 1D:
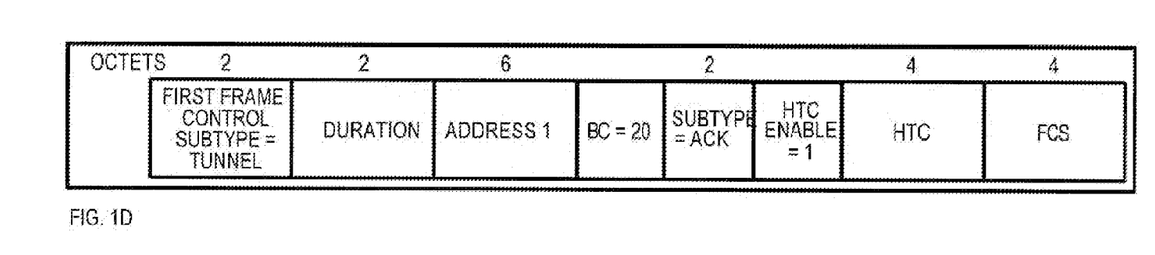
FIG. 1D depicts an example of a tunneling frame for implementing an Acknowledgment-High Throughput Control function.
Figure 1E:
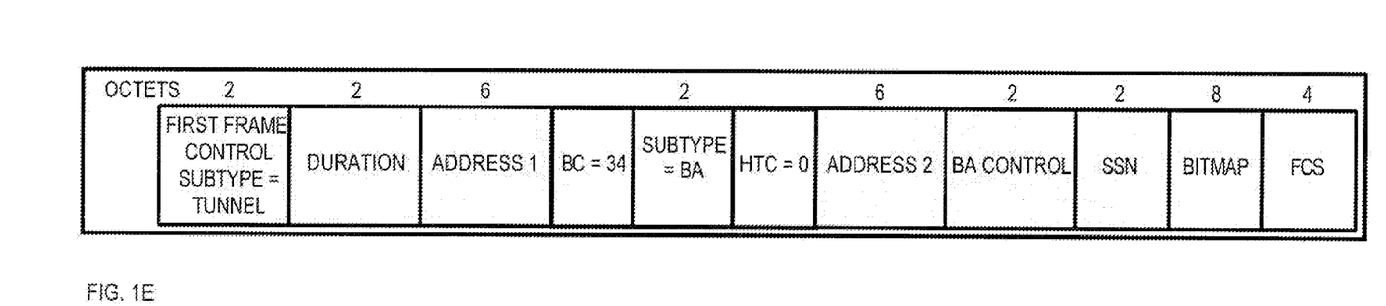
FIG. 1E depicts an example of a tunneling frame for implementing a Block Acknowledgment function.

FIG. 1D shows an example of a frame for transmitting the HTC used for channel estimation by a receiver of the frame. A first frame control is of type control and of subtype tunnel. Following the first frame control is the duration and address fields. In this example, the byte count field of the second frame control is 20. The subtype is ACK and HTC enable is enabled. Following the second frame control is the HTC field, followed by the Frame Check Sequence (FCS). FIG. 1E depicts a frame for when the subtype of the second frame control is BA (Block Acknowledgement) and the HTC enable field is disabled. This demonstrates that the second frame control field may be used for multiple purposes already defined and yet to be defined in 802.11n. In this example, the BA field within the second frame control field provides agreement between the transmitter and receiver to transmit blocks of data frames. The BA control field provides an identity of this agreement. The address2 field contains the transmitter address. The SSN (Starting Sequence Number) field is the sequence number of the first data frame for which the BA is sent. The Bitmap field is a sequence of bits, one for each frame sent in the block. When set to 1, a bit of the bitmap field indicates that the corresponding data frame is received successfully. When set to 0, this indicates that the corresponding frame is lost.

Embodiments thus provide a method for frame tunneling with backward compatibility with legacy systems and with High Throughput Control for systems comprising digital beam forming. This tunneling approach can deliver Network Allocation Vectors (NAV) using transmission rates and waveforms already used by existing legacy systems, as well as delivering NAVs using rates and waveforms of high throughput networks such as those for 802.11n. One subtype is used to deliver different frames, thereby preserving the limited range of applicable subtypes. Thus, different frames can be submitted that include modified frames already defined in the current state of 802.11n, as well as new frames. Including a byte count field increases the level of reliability of the frame at early stages of decoding. Embodiments further allow one to submit frames with one address field with low overhead because the second frame control field follows the address field.

Note that the methodology of frame tunneling described herein applies not only to frames that are of type "control" but of type "data" and "management" as well as other types that may be defined by an applicable standard. Note also that apart from announcing a sounding frame and a type of channel estimation feedback, the HTC field may comprise other information instead or as well. For example, the HTC field may comprise a field that requests from a receiving station a modulation and code scheme. The HTC field may comprise a field that requests from a receiving station antenna selection information to select certain elements of the antenna array of the transmitting station for transmission to the receiving station.

The HTC field may comprise a reverse direction field that allows the transmitter to temporarily delegate its transmitter rights to a receiving station for better utilization of link capacity. Also note that the second frame control field may comprise, in addition to or instead of, the byte count field, a transmission rate field specifying a data transmission rate for early error detection by the receiving station.

Accordingly, present embodiments provide a communication device, comprising a frame builder to provide a medium access frame comprising a frame control field and a high throughput control (HTC) field. The HTC field announces a subsequent transmission of a sounding frame and the type of feedback expected from a receiver of the sounding frame. The frame builder may be implemented in hardware by an application specific integrated circuit, or may be implemented in firmware. Embodiments further provide a transceiver with a digital beam former and an array of antennas to transmit the frame and a sounding frame through a spatial channel to a receiving communication device.

Figure 2:
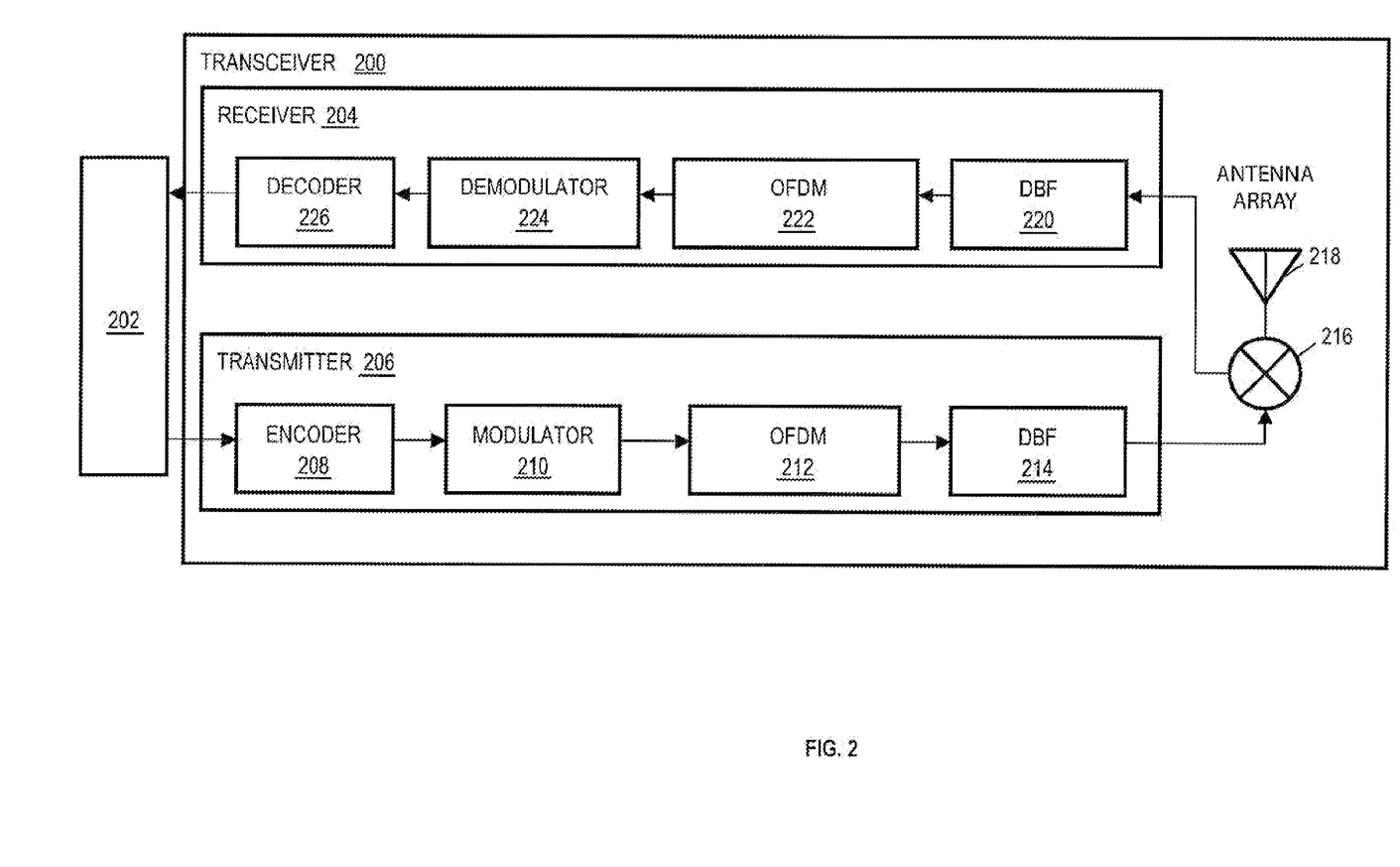
FIG. 2 depicts a general flow of signal processing in a transceiver for Orthogonal Frequency Division Multiplexing (OFDM)-based broadband communication in a wireless network.

FIG. 2 shows a more detailed view of a general flow of example signal processing in a transceiver 200. Transceiver 200 comprises a receiver 204 and a transmitter 206. Transmitter 206 may comprise one or more of an encoder 208, a modulator 210, an OFDM 212, and a DBF 214. Receiver 204 may comprise one or more of a DBF 220, an OFDM 222, a demodulator 224 and a decoder 226. Each of these components of transceiver 200 and their functions will now be described.

Encoder 208 of transmitter 206 receives data destined for transmission from a processor core 202. Processor core 202 may present data to transceiver 200 in blocks such as bytes of data. In particular, processor core 202 comprises a frame builder to construct and send to the transceiver medium access frames. Encoder 208 encodes the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security.

One type of encoding is block encoding. In block encoding, the encoder encodes a block of k information bits into corresponding blocks of n code bits, where n is greater than k. Each block of n bits from the encoder constitutes a code word in a set of $N=2^k$ possible code words. An example of a block encoder that can be implemented is a Reed-Solomon encoder, known by those skilled in the art of encoding. Another type of encoding is linear convolutional encoding. The convolutional encoder may be viewed as a linear finite-state shift register with an output sequence comprising a set of linear combinations of the input sequence. The number of output bits from the shift register for each input bit is a measure of the redundancy in the code. Thus, different embodiments may implement different encoding algorithms.

Modulator 210 of transmitter 206 receives data from encoder 208. A purpose of modulator 210 is to transform each block of binary data received from encoder 208 into a unique continuous-time waveform that can be transmitted by an antenna upon up-conversion and amplification. Modulator 210 impresses the received data blocks onto a sinusoid of a selected frequency. More specifically, modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

In one embodiment, modulator 210 maps a sequence of binary digits into a set of discrete amplitudes of a carrier frequency. This is called Pulse Amplitude Modulation (PAM). Quadrature Amplitude Modulation (QAM) is attained by impressing two separate k-bit symbols from the information sequence onto two quadrature frequencies, cos(2πft) and sin(2πft).

In another embodiment, modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta=2\pi(n-1)/n$ for n a positive integer less than or equal to N. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 210 maps the blocks of data from an information sequence received from encoder 208 into a set of discrete frequency shifts to produce a Frequency-Shift-Keyed (FSK) signal. A resulting equivalent low pass signal may be represented as:

$$u(t) = \sum_{n=0}^{\infty} \exp(j\pi \Delta f t I_n) g(t - nT)$$

where $I_n$ is an odd integer up to N−1 and $\Delta f$ is a unit of frequency shift. Thus, in an FSK signal, each symbol of an information sequence is mapped into one of N frequency shifts.

Persons of skill in the art will recognize that the mathematical equations discussed herein are illustrative, and that different mathematical forms may be used to represent the pertinent signals. Also, other forms of modulation that may be implemented in modulator 210 are known in the art.

The output of modulator 210 may be up-converted to a higher carrying frequency. Or, modulation may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \frac{1}{2}[\sin(A+B) + \sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

Figure 2A:
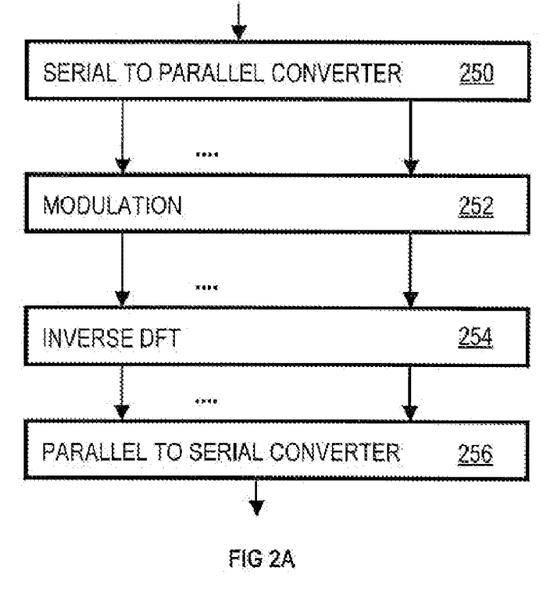
FIG. 2A depicts an embodiment of an example OFDM suitable for use in a transmitter of the transceiver of FIG. 2.

The output of modulator 210 is fed to an Orthogonal Frequency Division Multiplexer (OFDM) 212. OFDM 212 impresses the modulated data from modulator 210 onto a plurality of orthogonal sub-carriers. A block diagram of one embodiment of an OFDM 212 is shown in FIG. 2A. A serial bit stream is converted to blocks of n bits of data in parallel by a serial-to-parallel converter 250. Optionally, each bit is modulated in parallel by a modulator 252, instead of, or in addition to the modulation provided by modulator 210. Then, an inverse discrete Fourier transform (DFT), e.g. a Fast Fourier Transform (FFT), is performed on the data by inverse FFT 254. This impresses the data onto multiple orthogonal sub-carriers. Then, the data may be converted to a serial stream of data of different channels by a parallel to serial converter 256.

Returning to FIG. 2, the output of OFDM 212 is fed to Digital Beam Former (DBF) 214. Digital beam forming techniques are employed to increase the efficiency and capacity of a wireless system. Generally, digital beam forming uses digital signal processing algorithms that operate on the signals received by, and transmitted from, an array of antenna elements to achieve enhanced system performance. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The problem to be solved by digital beam forming may be stated generally as the problem of separating a set of L information signals, y, that are superimposed and received by an N-element antenna array as a set of N signals, x. Conversely, digital beam forming is employed to solve the problem of combining a set of L information signals, y, to form a set of N signals, x, to be transmitted by the N elements of the antenna array. The desired information signals, y, may be obtained from a matrix multiplication on the received signals, x:

y=Ux where U is a matrix determined by computational methods. Similarly, a set of signals, x, to be transmitted by the array may be obtained from a matrix multiplication on the information signals, y:

x=Vy where V is also a matrix determined by computational methods. The matrices U and V are chosen to separate out at least one of the information signals of y from a received vector of signals x. Note that the matrices U and V are not inverses of each other since the required beam steering for transmission and reception are generally not the same.

Figure 3A:
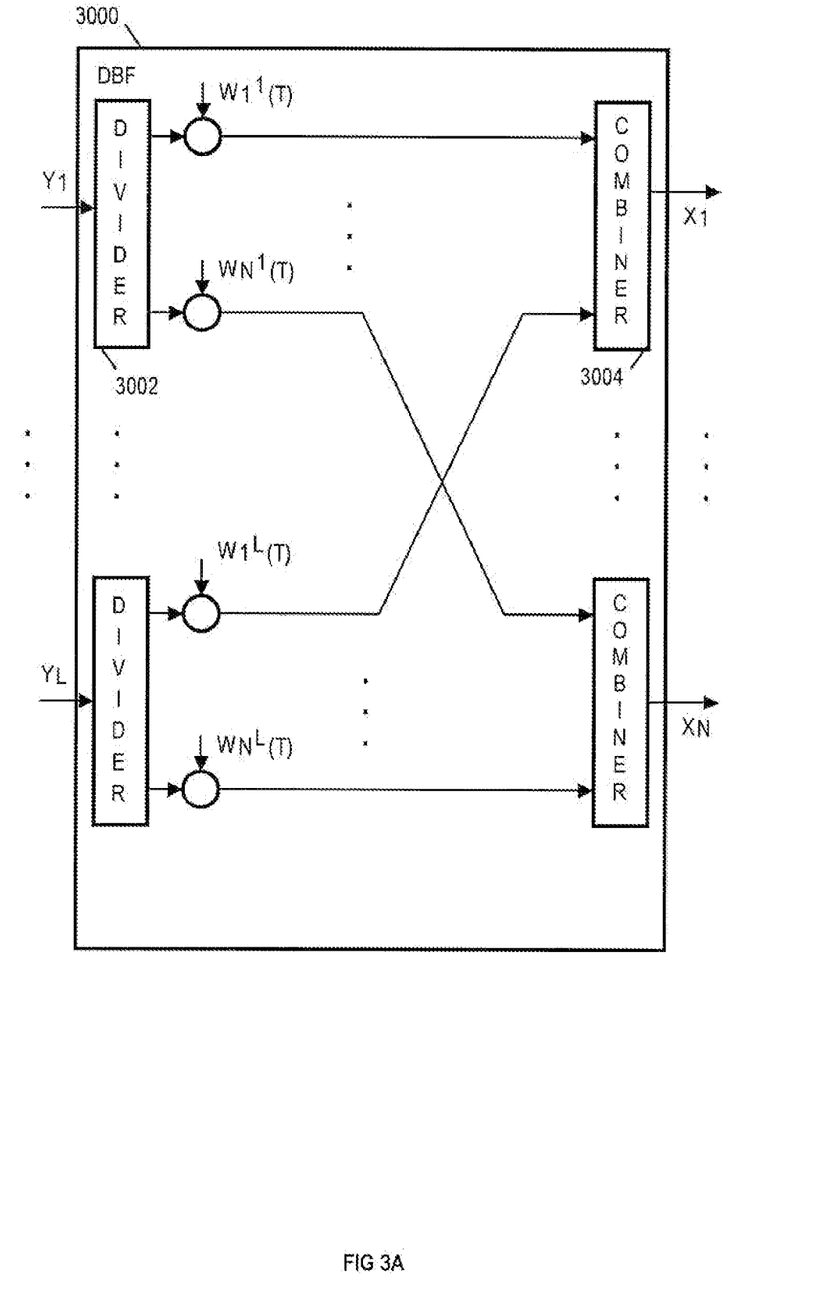
FIG. 3A depicts an example Digital Beam Former (DBF) suitable for use in a transmitter of the transceiver of FIG. 2.

FIG. 3A shows a multiple beam former 3000 for transmitting L beams from an N-element antenna array. L information signals, $y_1$ through $y_L$, are input in parallel to power dividers 3002. Each power divider 3002 divides the received information signal into N parallel channels. At the output of a power divider, the signal in each of the N channels is multiplied by a different weight, $W^1_n$, each weight being an entry in the matrix V. The resultant products are multiplexed to a plurality of combiners 3004. The output of the combiners (e.g., summers) 3004 are the signals $x_1$ to $x_N$. Each signal $x_n$ is fed to a different one of the N antenna array elements of an antenna array 218.

FIG. 2 also shows diplexers 216 connected to antenna array 218. Thus, in this embodiment, a single antenna array is used for both transmission and reception. When transmitting, the signal passes through diplexers 216 and drives the antenna with the up-converted information-bearing signal, x. During transmission, the diplexers prevent the signals to be transmitted from entering receiver 204. When receiving, information bearing signals received by the antenna array pass through diplexers 216 to deliver the signal from the antenna array to receiver 204. The diplexer then prevents the received signals from entering transmitter 206. Thus, diplexers 216 operate as switches to alternately connect the antenna array elements to the receiver and the transmitter.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. Antennas 218 may be implemented using existing printed circuit board metallization technology. Microstrips, striplines, slotlines, and patches, for example, are all candidates for antennas 218.

Figure 3B:
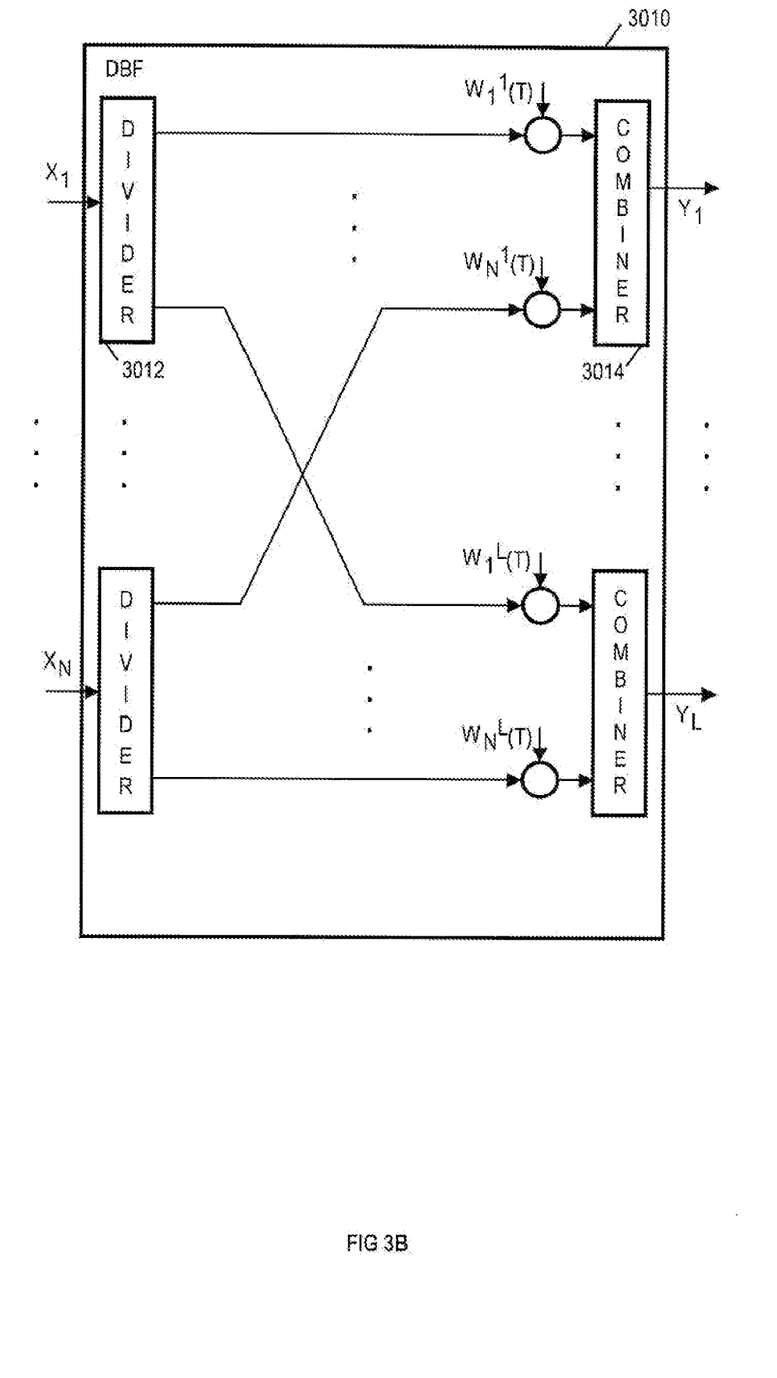
FIG. 3B depicts an example DBF suitable for use in a receiver of the transceiver of FIG. 2.

FIG. 2 also shows an embodiment of a receiver 204 for receiving, demodulating, and decoding information bearing signals. The received signals are fed from antenna elements 218 to a Digital Beam Former (DBF) 220. DBF 220 transforms N antenna signals into L information signals. FIG. 3B shows a functional diagram of DBF 220, 3010 for determining information signals y from received signals x. The N received signals, x, are each fed to power dividers 3012. The outputs of power dividers 3012 are multiplexed among a set of combiners 3014. Each input to a combiner is multiplied by a weight, $W^1_n$, each weight being an entry in the matrix U, for computation of y=Ux.

Figure 2B:
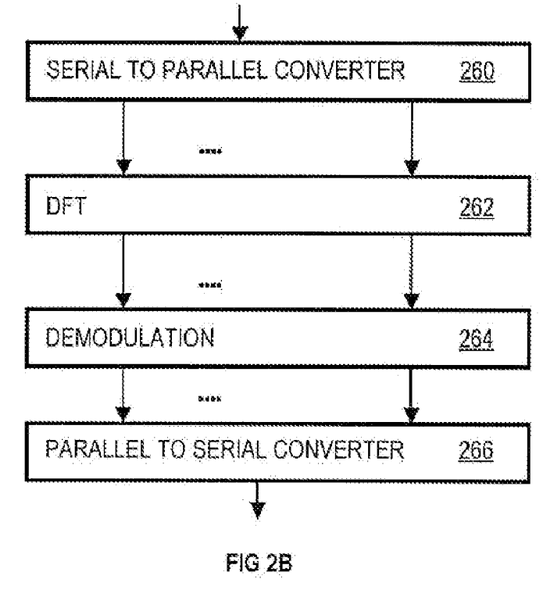
FIG. 2B depicts an embodiment of an example OFDM suitable for use in a receiver of the transceiver of FIG. 2.

The output of DBF 220 is fed to Orthogonal Frequency Division Multiplexer (OFDM) 222. OFDM 222 extracts signal information from the plurality of subcarriers onto which information bearing signals are modulated. FIG. 2B shows a block diagram of OFDM 222. First, a sequential stream of data is converted to parallel 260. Then, a discrete Fourier transform (DFT) such as, e.g., a Fast Fourier Transform (FFT) 262, is performed to extract the signal information from the sub-carriers. In one embodiment, demodulation 264 is performed in parallel on the output data of the FFT. In another embodiment, demodulation is performed separately by a separate demodulator 224. Accordingly, in one embodiment, the OFDM processed signals are converted to a serial data stream 266 and input to demodulator 224.

Demodulator 224 demodulates the received signal. Demodulation is the process of extracting information content from the received signal to produce an un-demodulated information signal. The method of demodulation depends on the method by which the information is modulated onto the received carrier signal. Thus, for example, if the modulation is PSK, demodulation involves phase detection to convert phase information to a binary sequence. Demodulation provides to the decoder a sequence of bits of information.

Decoder 226 decodes the received binary data blocks from demodulator 224 and transmits the decoded information to processor core 202.

Thus, embodiments include a wireless-capable unit, comprising a frame builder. A transmitter coupled to the frame builder comprises a digital beam former and an antenna array to transmit a frame from the frame builder. The frame comprises a first frame control field and a second frame control field followed by a high throughput control (HTC) field. The HTC field announces a subsequent sounding frame and specifies a type of channel estimation feedback expected from a receiving station of the transmitted frame. A receiver of the wireless unit receives channel estimation feedback from the receiving station of the transmitted frame. The channel estimation feedback may comprise an estimate of a channel matrix or may comprise a beam steering matrix.

Persons of skill in the art will recognize that a transceiver will comprise numerous additional functions not shown in FIG. 2. Thus, a transceiver will comprise a Direct Random Access Memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. Thus, FIG. 2 shows a general flow of signal processing in a transceiver. Actual implementations may vary. For example, not all embodiments may apply OFDM.

The RF channel between communications devices has a transfer function:

$$H=USV^T$$

Where U and V are unitary steering matrices and S is a rectangular matrix whose diagonal elements are real and non-negative and whose off-diagonal elements are zero. If the channel matrix H can be determined, the matrices U and V can be computed using the method of Singular Value Decomposition (SVD). Accordingly, a transmitting station may transmit a sounding frame to a receiving station to enable the receiving station to estimate the channel between the transmitting station and the receiving station. Before sending the sounding frame, the HTC enabling field of the second frame control field of the medium access control field is enabled and the HTC frame is transmitted. The HTC frame announces the transmission of the sounding frame and specifies the type of feedback expected from the receiving station.

Thus, embodiments provide for spatial channel steering in a wireless system. In one embodiment, a receiver of a first communications device estimates a channel matrix from a sounding frame received from a second transmitting device. The first device may decompose the channel matrix to obtain a spatial channel matrix, H. In one embodiment, the spatial channel matrix is transmitted to the second device. Within the second device, the spatial channel matrix is resolved into a steering matrix V that is applied to information signals to produce substantially independent spatial channels. In another mode of operation, the receiver of the first device computes the steering matrix V for beam steering of information into a plurality of substantially independent spatial channels. The receiver of the first device then transmits the steering matrix to the second device. A main difference between these two types of feedback is that the channel matrix is more precise but takes longer to transmit back to the transmitter, whereas a steering matrix is shorter but takes longer to compute by the receiver. The HTC field in the frame following the second frame control field indicates which mode of operation is performed by the receiving device.

Figure 4:
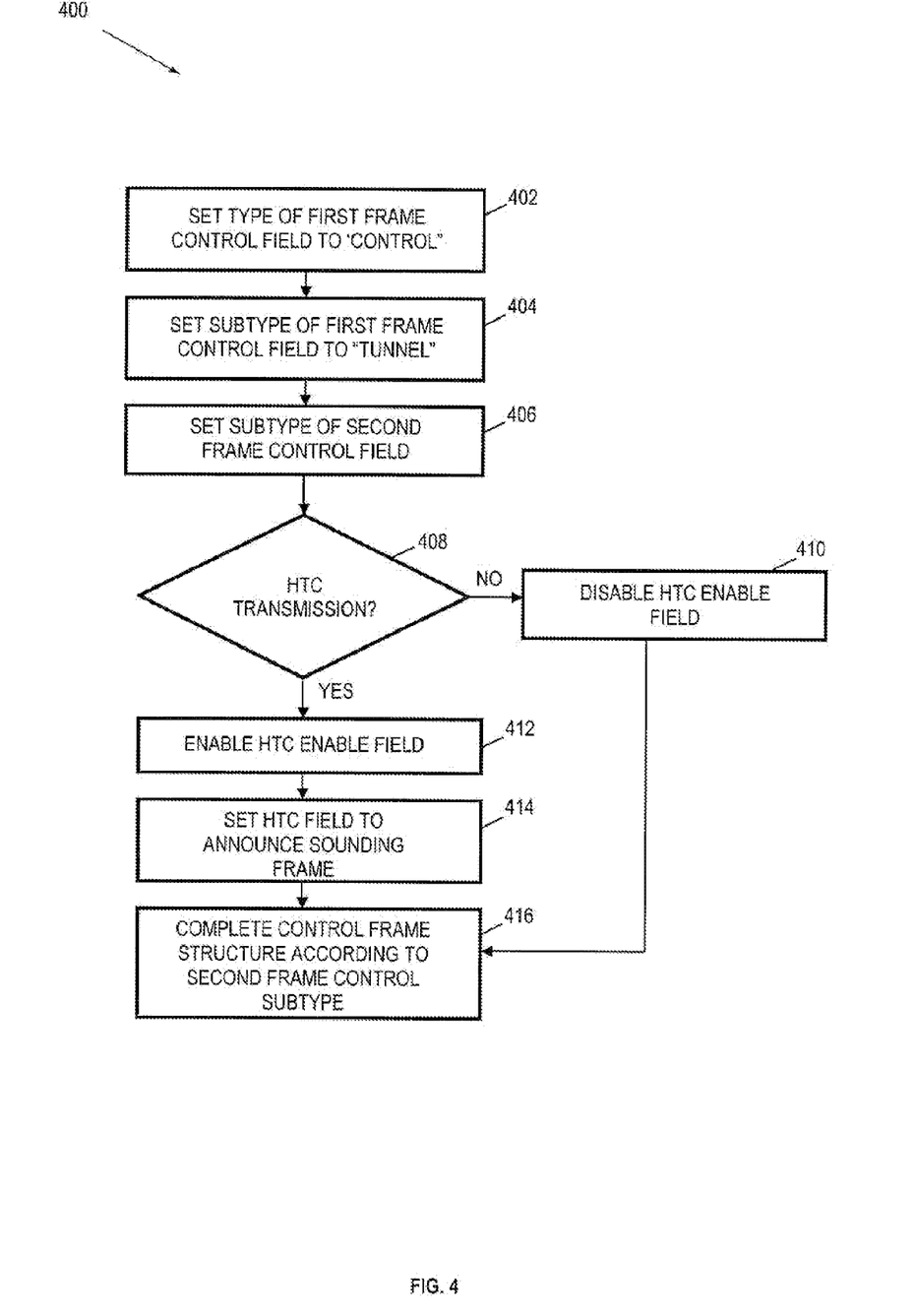
FIG. 4 depicts an example flowchart for constructing a tunneling frame.

FIG. 4 shows an example flowchart 400 of an embodiment for building a control frame according to embodiments described herein. To designate that the frame is for control, the systems sets the type of the first frame control field to "control" (element 402). To designate that the control frame is a tunneling frame, the system sets the type of the first frame control field to "tunnel" (element 404). The system also sets the subtype of the second frame control field (element 406). This subtype designates the function of the control frame and may be of subtype RTS, CTS, ACK, BA or other subtype defined in the relevant standard or to be defined by a standard such as IEEE 802.11n. The system determines if an HTC field is to be transmitted (element 408). If not, the system disables the HTC enable field of the second frame control field (element 410) and the system constructs the remainder of the control frame accordingly (element 416). If the system determines that an HTC field is to be transmitted, the system enables the HTC enable field (element 412). The system also sets the value of the HTC field itself to announce the sounding frame transmission and the type of feedback expected from the receiving station (element 414). The system further constructs the remainder of the control frame including the frame check sequence (element 416).

Thus, embodiments may comprise a method for medium access control for achieving high throughput in a wireless communications system employing beam steering. One such method comprises providing a first frame control field of a subtype equal to tunnel. A second frame control field is provided comprising a high throughput control (HTC) enable field to indicate whether a subsequent field comprises an HTC field to announce transmission of a sounding frame for channel estimation. If the HTC enabling field is enabled, an HTC field is provided to announce transmission of a sounding frame for channel estimation.

Some embodiments are implemented as a program product for use with an embedded processor such as processor core 202 of FIG. 2. The program product could be used on other computer systems or processors. The program(s) of the program product defines functions of the embodiments (including the methods described herein) and can be contained on a variety of media. Illustrative media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks.

In general, the routines executed to implement the embodiments, may be part of an operating system or a specific application, component, program, module, object, or sequence of instructions. A computer program typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment. However, it should be appreciated that any particular program nomenclature that follows is used merely for convenience, and thus embodiments should not be limited to use solely in any specific application identified and/or implied by such nomenclature.

Another embodiment provides a machine-accessible medium containing instructions effective, when executing by a machine, to cause the machine to perform a series of operations for tunneling frame construction. The operations comprise generating a first frame control field to designate a frame as a tunneling frame. The operations further comprise generating a second frame control field comprising a high throughput control (HTC) enabling field to indicate whether a subsequent field shall comprise an HTC field to announce transmission of a sounding frame for channel estimation. The operations also comprise generating an HTC field to announce transmission of a sounding frame for channel estimation if the HTC enabling field is set to enable.

Some embodiments have been described in detail above. It should be understood that various changes, substitutions and alterations can be made herein without departing from the spirit and scope as defined by the appended claims. An embodiment may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. An apparatus, comprising:
a first station adapted for communications in a wireless network that operates in compliance with Standards 802.11, promulgated by the Institute of Electrical and Electronics Engineers (IEEE 802.11);
wherein the IEEE 802.11 standards define a High Throughput Control (HTC) field used for signaling such that the HTC field can be transmitted as part of a control frame and defines that a receiving station shall assert a network allocation vector (NAV) in response to receiving a frame of a type indicative of a management frame, data frame, or a control frame; and
wherein the first station is configured to use a frame with a first subtype and is constructed to deliver an HTC field within a Control Frame (Control Frame +HTC) to receiving stations conforming to an IEEE 802.11 standard, thereby enabling receiving stations compliant with the IEEE 802.11 standard to be able to assert the network allocation vector (NAV) in a duration field of the frame.

2. The apparatus of claim 1, wherein the frame further comprises:
a first control field prior to the duration field defining the first subtype;
an address1 field following the duration field;
a second control field following the address1 field comprising a byte count field, a subtype field indicating a second frame control in which the HTC field is concatenated with the Control Frame, and a high throughput control (HTC) enabling field that if set to enable will indicate that the HTC field follows the second control field.

3. The apparatus of claim 1, wherein the frame further comprises the duration field to specify a duration of transmission of the frame.

4. The apparatus of claim 1, wherein the frame further comprises a Frame Check Sequence (FCS).

5. The apparatus of claim 1, further comprising a transceiver with a digital beam former and an array of antennas to transmit the frame through a spatial channel to a receiving communication device.

6. The apparatus of claim 1, wherein the first station uses one subtype in the first control field to deliver different control frames to preserve a limited range of applicable subtypes.

7. The apparatus of claim 1, wherein different control frames that can be submitted include modified control frames defined in the 802.11 standard.

8. The apparatus of claim 1, wherein different control frames that can be submitted include new frames defined in the 802.11 standard.

9. An apparatus, comprising:
a first station adapted for communications in a wireless network that operates in compliance with Standards 802.11, promulgated by the Institute of Electrical and Electronics Engineers (IEEE 802.11), the first station configured to use a frame format that includes:
a first control field of the frame, the first control field defining a subtype using a type field and a subtype field;
a duration field following the first control field;
an address1 field following the duration field;
a second control field following the address1 field comprising a byte count field, a subtype field and a high throughput control (HTC) enabling field that if set to enable will indicate that the HTC field follows the second control field.

10. The apparatus of claim 9, wherein the frame further comprises the duration field to specify a duration of transmission of the frame.

11. The apparatus of claim 9, wherein the frame further comprises a Frame Check Sequence (FCS).

12. The apparatus of claim 9, further comprising a transceiver with a digital beam former and an array of antennas to transmit the frame through a spatial channel to a receiving communication device.

13. The apparatus of claim 9, wherein the first station uses one subtype in the first control field to deliver different control frames to preserve a limited range of applicable subtypes.

14. The apparatus of claim 13, wherein different control frames that can be submitted include modified control frames defined in the 802.11 standard.

15. A method, comprising:
operating, by a first station adapted for communications in a wireless network, in the wireless network in compliance with Standards 802.11, promulgated by the Institute of Electrical and Electronics Engineers (IEEE 802.11); wherein the IEEE 802.11 standards define a High Throughput Control (HTC) field used for signaling such that the HTC field can be transmitted as part of a control frame and defines that a receiving station shall assert a network allocation vector (NAV) in response to receiving a frame of a type indicative of a management frame, data frame, or a control frame; and
generating, by the first station, a frame with a first subtype, the frame being constructed to deliver an HTC field within a Control Frame (Control Frame +HTC) to receiving stations conforming to an IEEE 802.11 standard to enable a legacy station compliant with the IEEE 802.11 standard prior to IEEE 802.11n to be able to assert the network allocation vector (NAV) in a duration field of the frame.

16. The method of claim 15, further comprising transmitting the frame through a spatial channel to a receiving communication device via a transceiver with a digital beam former and an array of antennas.

17. The method of claim 15, wherein generating the frame comprises generating the frame comprising:
   a first control field prior to the duration field defining the first subtype;
   an address1 field following the duration field;
   a second control field following the address1 field comprising a byte count field, a subtype field a second frame control in which the HTC field is concatenated with the Control Frame, and a high throughput control (HTC) enabling field that if set to enable will indicate that the HTC field follows the second control field.

18. The method of claim 15, wherein generating the frame comprises generating the frame comprising the HTC enabling field set to disable.

19. The method of claim 15, wherein the first station uses one subtype in the first control field to deliver different control frames to preserve a limited range of applicable subtypes.

20. The method of claim 15, wherein different control frames that can be submitted include modified control frames defined in the 802.11 standard.

* * * * *